(12) United States Patent
Bura et al.

(10) Patent No.: US 7,548,968 B1
(45) Date of Patent: *Jun. 16, 2009

(54) POLICING INTERNET DOMAINS

(75) Inventors: Christopher J. Bura, Pleasant Hill, CA (US); David A. DeMartini, Bremerton, WA (US)

(73) Assignee: MarkMonitor Inc., Boise, ID (US)

( * ) Notice: Subject to any disclaimer, the term of this patent is extended or adjusted under 35 U.S.C. 154(b) by 607 days.

This patent is subject to a terminal disclaimer.

(21) Appl. No.: 11/009,524

(22) Filed: Dec. 10, 2004
(Under 37 CFR 1.47)

Related U.S. Application Data

(60) Provisional application No. 60/530,355, filed on Dec. 17, 2003, provisional application No. 60/530,354, filed on Dec. 17, 2003, provisional application No. 60/528,568, filed on Dec. 10, 2003, provisional application No. 60/527,145, filed on Dec. 10, 2003.

(51) Int. Cl.
  *G06F 15/16* (2006.01)
  *G06F 15/173* (2006.01)
  *G06F 15/177* (2006.01)
  *G06F 3/00* (2006.01)
  *G06F 3/048* (2006.01)

(52) U.S. Cl. ............... 709/223; 709/206; 709/207; 709/245; 715/736; 715/738; 715/841

(58) Field of Classification Search ............... None
See application file for complete search history.

(56) References Cited

U.S. PATENT DOCUMENTS

| | | | |
|---|---|---|---|
| 4,972,349 A | 11/1990 | Kleinberger | |
| 5,062,074 A | 10/1991 | Kleinberger | |
| 5,542,087 A | 7/1996 | Neimat et al. | |
| 5,764,906 A | 6/1998 | Edelstein et al. | |
| 5,819,271 A | 10/1998 | Mahoney et al. | |
| 5,842,206 A | 11/1998 | Sotomayor | |
| 5,848,410 A | 12/1998 | Walls et al. | |
| 5,864,676 A | 1/1999 | Beer et al. | |
| 5,864,845 A | 1/1999 | Voorhees et al. | |
| 5,881,131 A | 3/1999 | Farris et al. | |
| 5,898,836 A | 4/1999 | Freivald et al. | |
| 5,903,861 A | 5/1999 | Chan | |

(Continued)

OTHER PUBLICATIONS

U.S. Appl. No. 60/273,826, filed Mar. 8, 2001, File History, 41 pages.

(Continued)

*Primary Examiner*—Hassan Phillips
(74) *Attorney, Agent, or Firm*—Townsend and Townsend and Crew, LLP

(57) ABSTRACT

The present invention, in one set of embodiments, provides methods, systems and software that may be used to generate and manage enforcement actions against domains that are potentially and/or actually infringing rights of a user. Merely by way of example, some embodiments provide methods for identifying one or more domain names potentially subject to enforcement activity by a user. According to further embodiments, methods are provided for obtaining domain information regarding potential and/or actual infringing domains for a user. In certain embodiments, the present invention provides methods for analyzing domain information concerning potential and/or actual infringing domains and generating one or more enforcement messages for sending to one or more parties associated with the potentially and/or actually infringing domain names.

32 Claims, 16 Drawing Sheets

U.S. PATENT DOCUMENTS

| | | | |
|---|---|---|---|
| 5,913,215 A | 6/1999 | Rubinstein et al. | |
| 5,950,173 A | 9/1999 | Perkowski | |
| 5,999,940 A | 12/1999 | Ranger | |
| 6,009,459 A | 12/1999 | Belfiore et al. | |
| 6,029,175 A | 2/2000 | Chow et al. | |
| 6,041,326 A | 3/2000 | Amro et al. | |
| 6,092,074 A | 7/2000 | Rodkin et al. | |
| 6,119,124 A | 9/2000 | Broder et al. | |
| 6,141,653 A | 10/2000 | Conklin et al. | |
| 6,144,962 A | 11/2000 | Weinberg et al. | |
| 6,148,289 A | 11/2000 | Virdy | |
| 6,151,624 A | 11/2000 | Teare et al. | |
| 6,154,738 A | 11/2000 | Call | |
| 6,161,130 A | 12/2000 | Horvitz et al. | |
| 6,175,830 B1 | 1/2001 | Maynard | |
| 6,199,048 B1 | 3/2001 | Hudetz et al. | |
| 6,199,102 B1 | 3/2001 | Cobb | |
| 6,219,818 B1 | 4/2001 | Freivald et al. | |
| 6,230,168 B1 | 5/2001 | Unger et al. | |
| 6,237,144 B1 | 5/2001 | Delo | |
| 6,256,623 B1 | 7/2001 | Jones | |
| 6,266,668 B1 | 7/2001 | Vanderveldt et al. | |
| 6,282,549 B1 | 8/2001 | Hoffert et al. | |
| 6,298,341 B1 | 10/2001 | Mann et al. | |
| 6,311,182 B1 | 10/2001 | Colbath et al. | |
| 6,338,082 B1 | 1/2002 | Schneider | |
| 6,385,615 B1 | 5/2002 | Haeri et al. | |
| 6,389,458 B2 | 5/2002 | Shuster | |
| 6,392,668 B1 | 5/2002 | Murray | |
| 6,401,118 B1 | 6/2002 | Thomas | |
| 6,412,014 B1 | 6/2002 | Ryan | |
| 6,421,733 B1 | 7/2002 | Tso et al. | |
| 6,442,523 B1 | 8/2002 | Siegel | |
| 6,487,553 B1 | 11/2002 | Emens et al. | |
| 6,516,312 B1 | 2/2003 | Kraft et al. | |
| 6,564,253 B1 | 5/2003 | Stebbings | |
| 6,611,830 B2 | 8/2003 | Shinoda et al. | |
| 6,629,092 B1 | 9/2003 | Berke | |
| 6,631,357 B1 | 10/2003 | Perkowski | |
| 6,643,641 B1 | 11/2003 | Snyder | |
| 6,654,751 B1 | 11/2003 | Schmugar et al. | |
| 6,704,722 B2 | 3/2004 | Wang Baldonado | |
| 6,745,248 B1 | 6/2004 | Gardos et al. | |
| 6,751,606 B1 | 6/2004 | Fries et al. | |
| 6,760,746 B1 | 7/2004 | Schneider | |
| 6,880,007 B1 | 4/2005 | Gardos et al. | |
| 6,895,430 B1 | 5/2005 | Schneider | |
| 7,194,552 B1 | 3/2007 | Schneider | |
| 7,346,605 B1* | 3/2008 | Hepworth et al. | 707/3 |
| 2001/0047407 A1 | 11/2001 | Moore et al. | |
| 2001/0049747 A1 | 12/2001 | Stanback | |
| 2002/0026439 A1 | 2/2002 | Monroe | |
| 2002/0099693 A1* | 7/2002 | Kofsky | 707/3 |
| 2002/0129013 A1* | 9/2002 | Thomas | 707/3 |
| 2002/0147724 A1 | 10/2002 | Fries et al. | |
| 2002/0147880 A1 | 10/2002 | Wang Baldonado | |
| 2002/0156774 A1 | 10/2002 | Beauregard et al. | |
| 2002/0174132 A1 | 11/2002 | Silverman | |
| 2002/0194116 A1 | 12/2002 | Coakley | |
| 2004/0019535 A1 | 1/2004 | Perkowski | |
| 2004/0054917 A1 | 3/2004 | Obrecht et al. | |
| 2004/0064561 A1 | 4/2004 | Parsons et al. | |
| 2004/0064736 A1 | 4/2004 | Obrecht et al. | |
| 2004/0098607 A1 | 5/2004 | Alagna et al. | |
| 2004/0123157 A1 | 6/2004 | Alagna et al. | |
| 2004/0169678 A1 | 9/2004 | Oliver | |
| 2004/0187023 A1 | 9/2004 | Alagna et al. | |
| 2004/0220903 A1* | 11/2004 | Shah et al. | 707/3 |
| 2004/0230449 A1 | 11/2004 | Franks | |
| 2004/0254848 A1 | 12/2004 | Golan et al. | |
| 2005/0004889 A1 | 1/2005 | Bailey et al. | |
| 2005/0004897 A1 | 1/2005 | Lipson et al. | |
| 2005/0060263 A1 | 3/2005 | Golan et al. | |
| 2005/0071741 A1 | 3/2005 | Acharya et al. | |
| 2005/0097320 A1 | 5/2005 | Golan et al. | |
| 2006/0011716 A1 | 1/2006 | Perkowski | |
| 2006/0271668 A1 | 11/2006 | Parsons et al. | |
| 2007/0208869 A1 | 9/2007 | Adelman et al. | |
| 2008/0010365 A1* | 1/2008 | Schneider | 709/223 |

OTHER PUBLICATIONS

U.S. Appl. No. 60/273,835, filed Mar. 8, 2001, File History, 21 pages.
U.S. Appl. No. 60/273,836, filed Mar. 8, 2001, File History, 70 pages.
U.S. Appl. No. 60/282,142, filed Apr. 9, 2001, File History, 74 pages.
U.S. Appl. No. 60/433,345, filed Dec. 13, 2002, File History, 15 pages.
U.S. Appl.No. 60/502,296, filed Sep. 12, 2003, File History, 16 pages.
U.S. Appl. No. 60/502,297, filed Sep. 12, 2003, File History, 9 pages.
Author Unknown, The Unfair Advantage Book on Winning The Search Engine Wars, Planet Ocean Communications, May 1, 1999, version SE32, 100 pages.
Davis III, G. Gervaise, "Internet Domain Names And Trademarks: Agrowing Area of Domestic and International Disputes", G. Gervais Davis III, Esq. Chapter Eleven, 1997-98, pp. 1-24.
Dreilinger et al., "Experiences with Selecting Search Engines Using Metasearch", ACM Press, ACM Transactions on Information Systems (TOIS), vol. 15, Issue 3, Jul. 1997 (pp. 195-222).
Eakins, J. P. et al., "Retrieval Of Trade Mark Images By Shape Feature—The Artisan Project," IEEE, pp. Sep. 1-Sep. 6, 1995.
Eakins, John P. et al., "Similarilty Retrieval Of Trademark Images," IEEE, pp. 53-63, Apr.-Jun. 1998.
Intellectual Property Network, Query is (search engine), IBM, printed date May 27, 1999, 4 pages.
Kuester, J, et al., "Hyperlinks, Frames and Meta-Tags: An Intellectual Property Analysis", IDEA: The Journal of Law and Technology 1998, 38 IDEA 243, 29 pages.
MarkMonitor, Inc., "Domain Name Tools," https://www.markmonitor.com/ip/tmsmart_input.asp?sid=71420003022810493766646, 1 page, 2003.
MarkMonitor, Inc., "Steps For Conducting A TMIQ Search," https://www.markmonitor.com/ip/help_tmiq.asp?sid=71420003022810493766646, 1 page, 2003.
Meeks, Brock N., "Scam diverts surfers to porn sites", MSNBC, May 18, 1999, 5 pages.
Sandburg, Brenda, "Do WIPO Trademark Rules Go Far Enough?", NLP IP Company, Tuesday, May 4, 1999, 3 pages.
Suda, P. et al., "Logo And Word Matching Using A General Approach To Signal Registration," IEEE, pp. 61-65, 1997.

* cited by examiner

POLICING INTERNET DOMAINS

CROSS-REFERENCE TO RELATED APPLICATIONS

This application claims the benefit of the following provisional applications, of which the entire disclosure of each is hereby incorporated by reference for all purposes: U.S. Prov. App. No. 60/527,145, filed Dec. 10, 2003 by Bura et al. and entitled "Analyzing Domain Ownership Information"; U.S. Prov. App. No. 60/528,568, filed Dec. 10, 2003 by Bura et al. and entitled "Policing Internet Domains"; U.S. Prov. App. No. 60/530,354, filed Dec. 17, 2003 by Bura et al. and entitled "Policing Internet Domains"; and U.S. Prov. App. No. 60/530,355, filed Dec. 17, 2003 by Bura et al. and entitled "Analyzing Domain Ownership Information."

This application is also related to the following commonly-owned, co-pending applications, of which the entire disclosure of each is hereby incorporated by reference for all purposes: U.S. patent application Ser. No. 11/009,530, filed on a date even herewith by Bura et al. and entitled "Analyzing Domain Ownership Information"; U.S. application Ser. No. 11/009,531, filed on a date even herewith by Bura et al. and entitled "Analyzing Domain Ownership Information"; and U.S. patent application Ser. No. 11/009,529, filed on a date even herewith by Bura et al. and entitled "Policing Internet Domains".

COPYRIGHT NOTICE

A portion of the disclosure of this patent document contains material that is subject to copyright protection. The copyright owner has no objection to the facsimile reproduction by anyone of the patent document or patent disclosure as it appears in the United States Patent and Trademark Office patent file or records, but otherwise reserves all copyright rights whatsoever.

BACKGROUND OF THE INVENTION

The Internet is undergoing explosive growth. Each day, millions of new web pages are created and many millions of people interact online. To link to an Internet website, a computer user typically enters a domain name that represents an IP (Internet protocol) address. Each domain name is unique and is assigned to a holder by one of a plurality of domain name registrars. It is the prevailing trend for businesses to establish and maintain presence in the marketplace via their websites and/or email addresses. Thus an Internet domain name may be highly valuable as an advertising and selling tool. Businesses generally try to acquire domain names which reflect their trademarks and brand names, also regarded as valuable intellectual property.

As Internet use has expanded, cybersquatters have tried to acquire domain names solely for the purpose of selling them to businesses whose brand names correspond to the domain names. Although legislation has been passed in an attempt to curb this practice, domain name squatting still continues. Additionally, it is increasingly common for web site operators to unknowingly acquire, in good faith, domain names that infringe upon other parties' trademark rights. Quite often, registration of an Internet domain name requires no trademark search or query before the registration process is initiated and completed.

Companies and individuals striving to preserve their rights in trademarks are finding it necessary to engage in Internet domain enforcement. Such enforcement may include, for example, opposing another's use of a domain name reflective of a trademark or brand name. Domain enforcement may involve hunting on the Internet for registered domain names that, for example, infringe, dilute or disparage a trademark or brand name. Enforcement also may entail demanding that a holder of such a domain relinquish the domain name and/or initiating a complaint or other enforcement action relating to one or more of such domains. Hunting for such domain names on the Internet tends to be not only time consuming but also hit-or-miss in view of the sheer volume of Internet use. Initiating and maintaining enforcement action against infringers also may be costly and time consuming.

BRIEF SUMMARY OF THE INVENTION

The present invention, in one set of embodiments, provides methods, systems and software that may be used to generate and manage enforcement actions against domains that are potentially and/or actually infringing rights of a user. Merely by way of example, some embodiments provide methods for identifying one or more domain names potentially subject to enforcement activity by a user. According to further embodiments, methods are provided for obtaining domain information regarding potential and/or actual infringing domains for a user. In certain embodiments, the present invention provides methods for analyzing domain information concerning potential and/or actual infringing domains and generating one or more enforcement messages for sending to one or more parties associated with the potentially and/or actually infringing domain names.

The present invention, in one set of embodiments, provides methods, systems and software that may be used to generate and send enforcement messages to parties associated with domains potentially subject to enforcement activity. Merely by way of example, a particular set of embodiments provides methods of identifying domain names potentially subject to enforcement actions according to received data. According to particular embodiments, enforcement messages may be generated for the domain names identified as potentially subject to enforcement action. In certain embodiments, enforcement messages may be sent to parties associated with the domain names identified as potentially subject to enforcement action.

Certain embodiments of the present invention provide methods, systems and software that may be used to facilitate enforcement of an Internet domain. Merely by way of example, particular embodiments provide methods for identifying domain names subject to enforcement by a user. In particular embodiments, in response to input from the user, an enforcement action cycle against an identified domain name may be commenced.

Particular embodiments of the present invention provide methods of identifying potentially objectionable domain names. The method may comprise, merely by way of example, searching a database for WHOIS information matching a search criterion other than a domain name and/or identifying one or more domain names associated with matching WHOIS information from the searching. In certain embodiments, identifying one or more domain names comprises identifying recurrences of WHOIS information associated with the one or more domain names.

Further embodiments provide systems, which may, in some cases, implement the methods of the invention. Merely by way of example, a system in accordance with some embodiments may comprise one or more computers. In particular embodiments, the computer(s) may be configured to gather from the Internet WHOIS data, which may pertain to one or more domain names. The computer(s) may be further configured to include the domain names and/or the gathered WHOIS data in a database. The computer(s) may then be configured to search the database for WHOIS data other than a domain name. At least one of the domain names thus may be identified. The search may be performed in response to user input.

In accordance with another set of embodiments, the computer(s) may be configured to gather from the Internet WHOIS data pertaining to a domain name, perhaps in response to a WHOIS inquiry, which may specify the domain names to a domain name registrar. The computer(s) may further provide the domain name to the user, possibly in response to the user inputting some or all of the gathered WHOIS data other than the domain name.

In some embodiments, the system may further comprise a database, which might include gathered WHOIS data and/or domain names, and/or one or more spiders, which may be configured to gather additional WHOIS data from the Internet, perhaps for inclusion in the database.

In some cases, enforcement actions may be taken against objectionable domain names. In certain aspects, enforcement actions may include the sending of email messages to person(s) associated with the objectionable domain name(s). By way of example, email messages may include cease and desist messages. In other aspects, templates for email messages may be stored in a database for selection and use by a user. In further aspects, information associated with objectionable domain names may be automatically included into email messages. In accordance with another set of embodiments, responses to enforcement messages may be recorded and/or stored in a database.

A further set of embodiments provides for categorizing and flagging domain name information. In certain aspects, software may generate icons to display the status of objectionable domain names.

Some embodiments of the present invention provide for the generation and management of actions against groups of objectionable domain names. In further embodiments, computer(s) and/or associated software provide for analysis of the status of enforcement actions. Status of enforcement actions may include information concerning delivery of a message to a party associated with an objectionable domain name and/or whether or not a response has been received. In some embodiments, the computer(s) and software may cause flags and alerts to be generated to a user depending upon the status of enforcement.

Further areas of applicability of the present invention will become apparent from the detailed description provided hereinafter. It should be understood that the detailed description and specific examples, while indicating various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings.

FIG. 3 illustrates a screen displaying a summary of domain name watch information according to various embodiments of the present invention.

FIG. 13 illustrates an enforcement action follow-up screen according to various embodiments of the present invention.

DETAILED DESCRIPTION OF THE INVENTION

The following description of various embodiments of the present invention is merely exemplary in nature and is in no way intended to limit the invention, its application, or uses.

Figure 1:
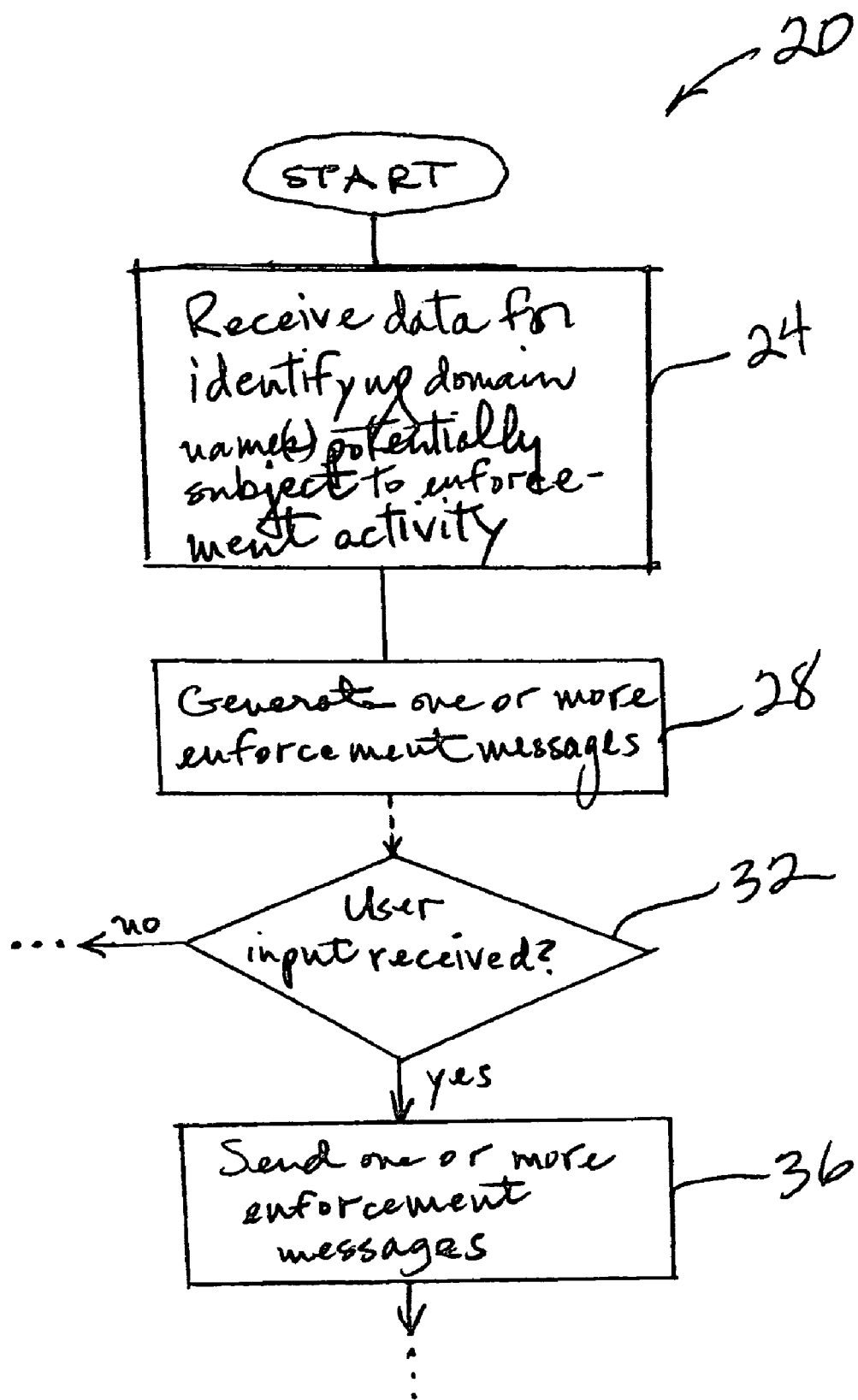
FIG. 1 is a flow diagram of a method of facilitating enforcement of an internet domain according to various embodiments of the present invention.

One set of embodiments provides methods of facilitating enforcement of an internet domain. An exemplary method in accordance with some embodiments is indicated generally in FIG. 1 by reference number 20. It should be noted generally that, unless the context clearly indicates otherwise, the terms "domain" and "domain name" are used interchangeably herein. Referring to FIG. 1, at step 24, data may be received for identifying one or more domain names potentially subject to enforcement activity by a user. At step 28, one or more enforcement messages may be generated for sending to one or more parties associated with the domain name(s). At step 32, it may be determined whether user input has been received. If so, at step 36 enforcement message(s) may be sent to the party(ies).

Figure 2:
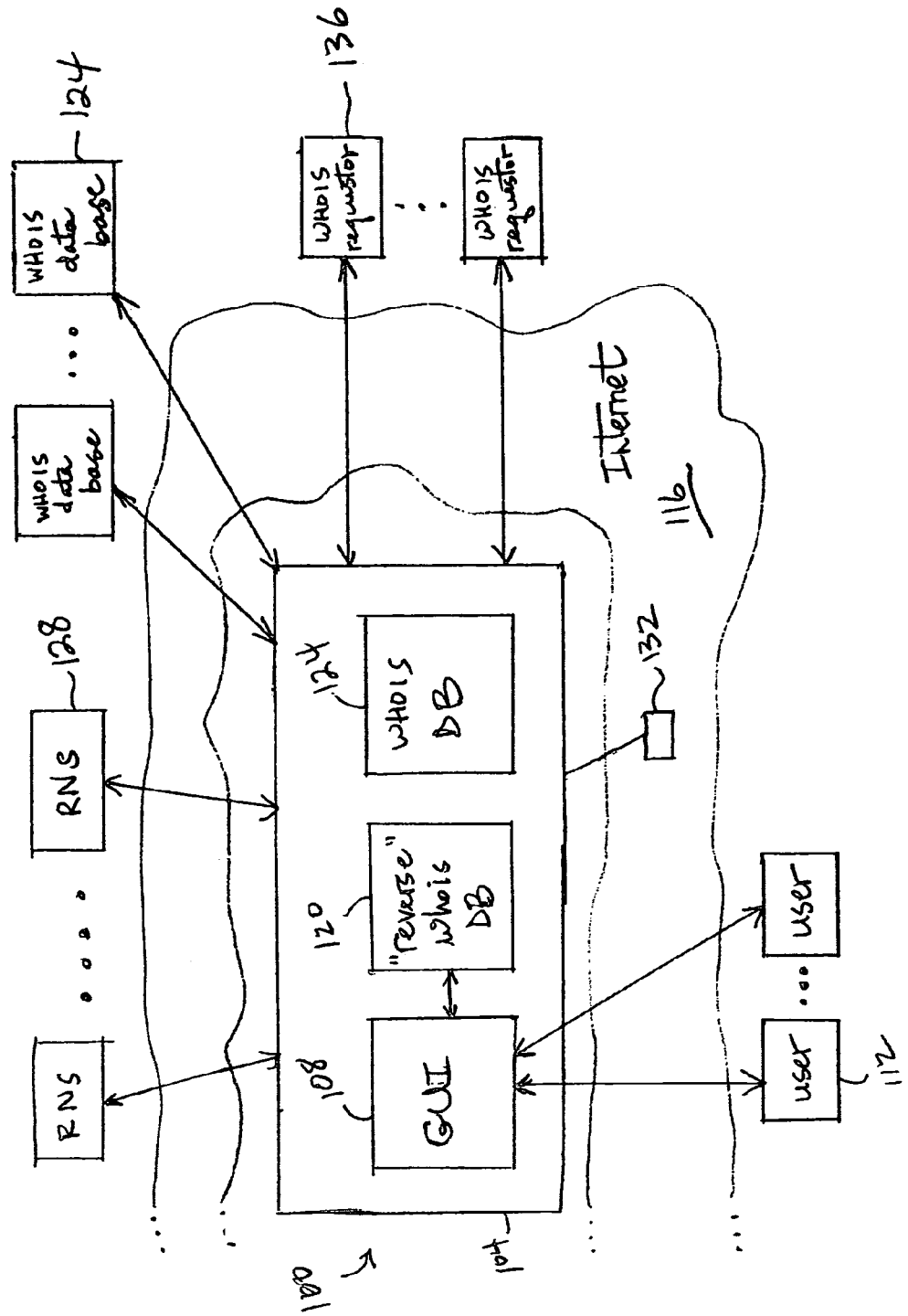
FIG. 2 is a block diagram of a system for enforcing an internet domain according to various embodiments of the present invention.

In accordance with particular embodiments, computer systems and/or software programs may be used to facilitate enforcement of an Internet domain (including without limitation computer systems and/or software programs that implement methods of the invention, such as the method 20 described above). An exemplary system is generally referred to in FIG. 2 by reference number 100. The system 100 may be operated, for example, by a provider of domain enforcement support services to domain name holders seeking to police their Internet domains.

Generally, the system 100 may include one or more computer(s) 104 configured to identify at least one domain name as subject to enforcement activity by a user of the system 100. The system 100 may allow the user to initiate, via a graphical user interface (GUI), at least one enforcement action cycle relative to at least one of the domain name(s), as further described below. It should be noted generally that the one or more computers 104 of the system 100 may include various kinds and/or combinations of computers, which may include but are not limited to server(s), personal computer(s), mainframe(s), switch(es) and/or processor(s) in combination with one or more memories.

The system 100 may, in some embodiments, include a software GUI driver 108 in communication with one or more computers 112 operated by one or more users of the system 100, for example, in a multi-user collaborative environment via the Internet 116. The GUI driver 108 may also communicate with a database 120, further described below, in which WHOIS data is stored in a searchable format.

Generally, and as known in the art, WHOIS data provides information pertaining to persons and/or organizations associated with an Internet domain. A plurality of databases 124 that hold WHOIS data are made available over the Internet, typically on a low-volume basis, to those who, for example, wish to determine who or what organization operates a particular domain. In general, WHOIS data is collected by domain name registrars from applicants who are registering domain names. WHOIS data obtained from a domain name registrant typically identifies an organization and/or contact associated with the domain name being registered. WHOIS data also typically identifies, among other elements of information, primary and secondary name servers for a domain name.

A plurality of domain name registrars register names in widely used top-level domains such as .com, .org, .net, .info, .biz and others which are managed by the Internet Corporation for Assigned Names and Numbers (ICANN). Registrars may also be authorized (by ICANN and/or by other authorities) to register names in country-code top level domains, such as .uk, .us, .ch, and others. WHOIS data for a particular domain name typically is included in at least one, but generally in not all, registrar WHOIS databases 124 publicly available over the Internet. Some domain names are "hidden," in that they are registered and managed by registrars utilizing servers other than ICANN root servers. WHOIS data generally is available from the registrars for hidden top-level domains, which include, for example, .arts, .golf, and .cars. WHOIS data may also be generated under circumstances other than in connection with registering a domain name. WHOIS information may be made available in a WHOIS database 124 on a server operated, for example, by a company or institution, to provide contact information pertaining to individual employees and/or departments.

Additionally, at least some information that could be found in a WHOIS database 124 (including without limitation primary and secondary name server information for a given domain) may also be kept on root name servers 128. Root name servers are distributed throughout the world and maintain domain information, including primary and secondary name server information for each domain as known in the art. When a client (which can include, merely by way of example, an Internet browser) wants to resolve a hostname and/or a domain name (e.g., if a user wishes to access the host and/or the domain, such as to view a web page, etc.), the client attempts to locate the IP (Internet Protocol) address for the domain name. The client first queries name servers of an Internet service provider (ISP) for the Internet user. If the ISP name servers have not cached an IP address for the requested domain name, at least one root name server (for example, one or more of the root name servers 128 shown in FIG. 2) may be queried to identify the name servers of the domain name. The root name server(s) return the requested name server information to the ISP, which then requests the domain name IP address from at least one of the domain name servers. The name server(s) return the requested IP address to the ISP, which typically caches the IP address and returns it to the client. As described in U.S. patent application Ser. No. 11/009,530, already incorporated by reference, WHOIS data may also be obtained via one or more IP registry databases.

The system 100 may, in some embodiments, include one or more software robots or spiders 132, for example, that "crawl" through Internet websites and follow hypertext links to obtain information over the Internet. The spiders 132 may gather WHOIS data pertaining to various domain names, including but not limited to universal resource locators (URLs) and email addresses. WHOIS data gathered by the spider(s) may be formatted and stored in the searchable WHOIS database 120 as further described below. It should be noted generally that the terms "WHOIS data" and "WHOIS information" as used herein may include data appropriate for inclusion in a WHOIS database 124, whether or not such data is actually present and/or found in a WHOIS database 124. Examples of a variety of types of WHOIS data are described in U.S. patent application Ser. No. 11/009,530, already incorporated by reference.

In some embodiments, the system 100 may locate and supply WHOIS and/or root name server data in response to requests for WHOIS information. Such a request may come via the Internet 116, for example, from a prospective domain name registrant (indicated in FIG. 2 by a computer 136) attempting to determine whether a domain name may be available for registration. In accordance with some embodiments, when such a request is received, the system 100 may query at least one WHOIS database 124 for WHOIS data pertaining to the domain name in question and return any such data to the requestor. In embodiments of the present invention, the system 100 may be operated by a domain name registrar that maintains its own WHOIS database 124. Additionally or alternatively, for example, if no such WHOIS data is found, the system 100 may query at least one root name server 128 to determine whether any primary/secondary server information is listed for the domain name in question (as could be the case, for example, if a domain name were registered but had invalid or no WHOIS data). The system 100 may return to the requester 136 any such data found in the root name server(s) 128.

The system 100 also may store such WHOIS data and/or root name server data in the searchable WHOIS database 120. The database 120 thus may include data obtained by the system 100 from various sources which store and/or provide such data in various formats, as previously described. The system 100 may be configured to format and/or store such data in the database 120 to allow a user to search the database 120, for example, to find any domain(s) having WHOIS data matching a given search criterion or criteria. Merely by way of example, WHOIS data may be obtained from WHOIS databases 124 in a variety of formats, each having different fields, different organization of fields, etc. The system 100, therefore, may be configured to reformat the obtained WHOIS data for consistency before, after, or during the process of storing the WHOIS data in the searchable database 120. Such reformatting may be performed by SQL commands, parsing engines, and/or any other appropriate vehicle.

In accordance with embodiments of the present invention, a user of the system 100 may enter into the system 100 one or more character strings, where each string may be all or part of one or more brand name(s) and/or trademark(s) of interest to the user (hereinafter referred to as the user "watch list"). Additionally or alternatively, the user may directly identify one or more domain names that may be subject to enforcement action, by entering character string(s) including such domain name(s). In some embodiments, the system 100 may search the Internet periodically (e.g., hourly, daily, weekly, etc.) for any registration activity of domain names that include the string(s). In accordance with embodiments of the present invention, the system 100 may report any such domain names and related activity to the user and provide any ownership information (e.g., WHOIS information) found for such domains.

In some embodiments, the user may select any or all reported domains and may specify one or more enforcement actions to be implemented relative to the selected domain(s). In accordance with particular embodiments, the term "enforcement action" may include a computer-implemented and/or computer-implementable procedure relating to domain enforcement activity against one or more domain names. Enforcement actions may include, but are not limited to, delivery of an email message (which might be, for example, a cease-and-desist message to an email address for a contact person associated with an infringing domain, a dispute notification to a registrar associated with an infringing domain, etc.).

The term "enforcement action cycle" may include the implementation of an enforcement action followed by the implementation of a reaction procedure, i.e., a procedure relating to a reaction (or lack thereof) relative to the implemented enforcement action. For example, in some embodiments, the user may cause the system 100 to implement an enforcement action, e.g., to send a cease-and-desist letter to a domain name contact person. The user may subsequently receive, e.g., from the contact person, an email or telephone response to the cease-and-desist message. In some embodiments, the user may indicate via the GUI 108 that a response was received. Optionally, the user may be allowed to enter text describing the response. The user may also use the GUI 108 to indicate, for example, that no response was received to an implemented enforcement action. In accordance with some embodiments, the system 100 may store the response information, as further described below, and thus may complete an enforcement action cycle.

In embodiments of the present invention, the GUI 108 may allow the user to initiate enforcement actions concurrently with respect to a plurality of domains. Such a group of enforcement actions is referred to herein as an "enforcement action group" and is described in further detail below. For example, the user may instruct the system 100 to send one or more email messages, for example, to a plurality of email addresses for a group of related domains. Also as further described below, an enforcement action initiated by the user but not yet implemented by the system 100, whether singly or in an enforcement action group, may be modified. Thus, for example, and as further described below, before the user causes the system 100 to implement an enforcement action, for example, by instructing the system 100 to deliver an email message, the user may change and/or customize the message.

Figure 3:
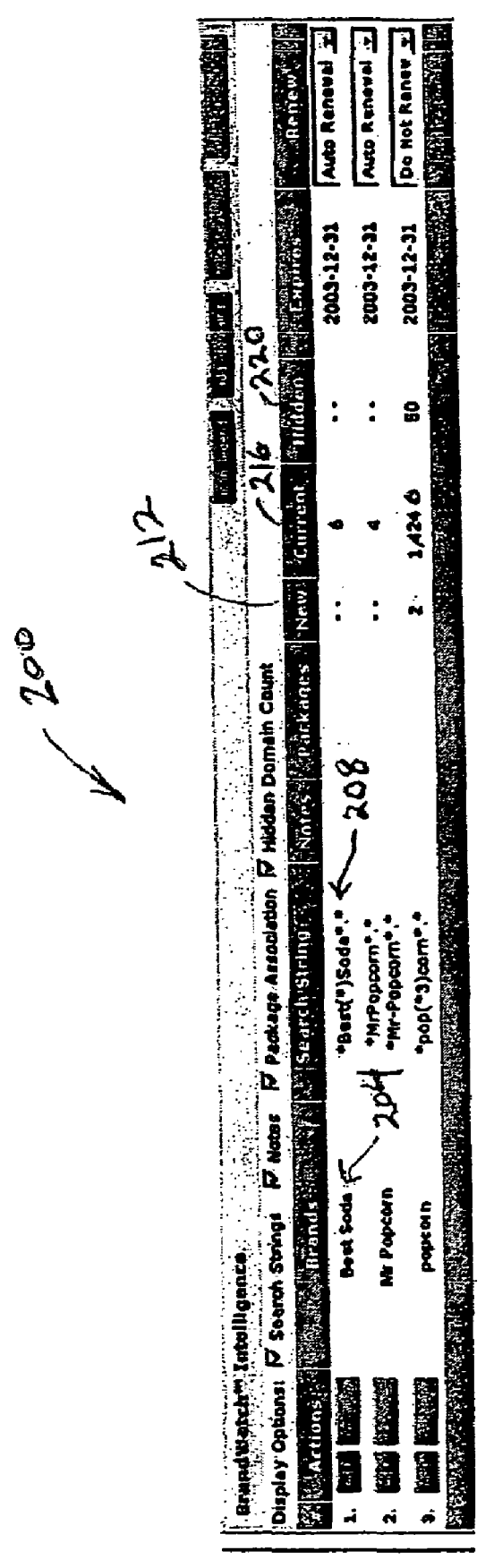

Merely by way of example, FIG. 3 illustrates an exemplary screen 200. In embodiments of the present invention, as shown in FIG. 3, the GUI driver 108 may display summary information. For a brand 204 and/or search string(s) 208, such information may include a tally 212 of new domains detected, a tally 216 of previously detected domains, and/or a tally 220 of hidden domains.

Figure 4:
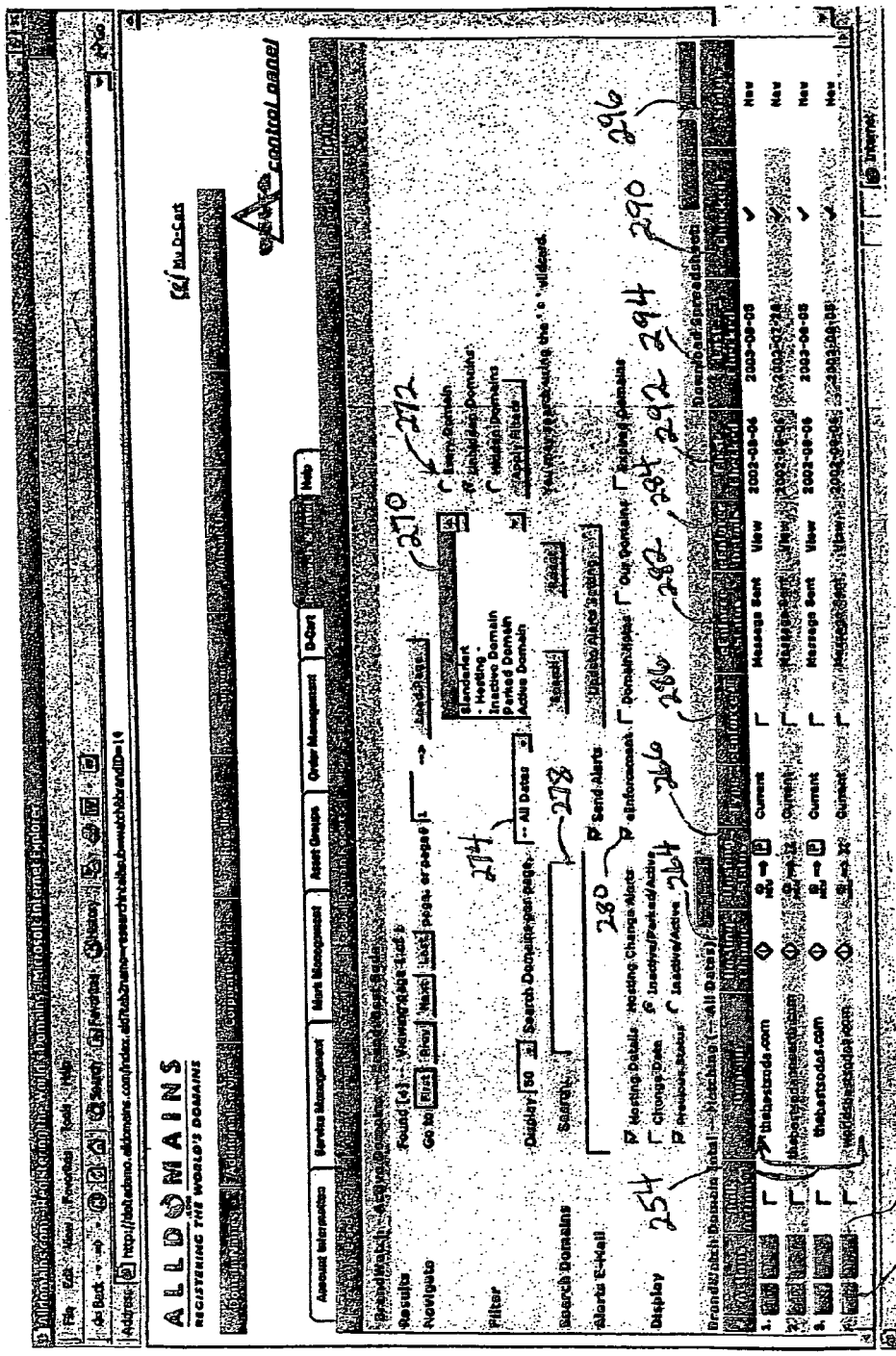
FIG. 4 illustrates a screen showing detailed information pertaining to a plurality of domain names according to various embodiments of the present invention.

Merely by way of example, FIG. 4 illustrates an exemplary screen 250. The exemplary screen 250 may be configured to show detailed information pertaining to a plurality of domain names 254 obtained by the system 100 that match a string for a brand in the user watch list. For each of the domain names 254, a button 258 may be activated to display available WHOIS data, if any. Intelligence type (e.g., whether new, current, hidden, expired or ad hoc) and/or intelligence status (e.g., whether a domain is new, or owned by the user or a third party) may be edited using a button 262. Hosting change and hosting status information for a domain name 254 may be displayed in columns 264 and 266 respectively.

In accordance with a set of embodiments, the system 100 may allow a user filter the display in various ways. Merely by way of example, the user may specify (e.g., via a drop-down menu 270), that the system 100 display a particular type of domain, e.g., parked, active and/or new domains. The user also may select from options 272 to cause the system 100 to display domains according to whether a domain is hidden or not hidden. A drop-down menu 274 may provide the user to specify the aging of displayed domain names. A search option 278 allows the user to enter additional search criteria, which can be used, for example, to limit the number of displayed domain names 254 to those of particular interest to the user.

An enforcement display option 280 may allow the user to see an enforcement status 282 and/or enforcement details 284 for a given domain name as further described below. Alternatively and/or in addition, the user also may be provided the ability to select an enforcement action option 286 for a given domain name, also further described below. Column 290 allows the user to check off domain(s) which have been reviewed on the screen 250 by the user. Columns 292 and 294 indicate dates a domain was first checked and last checked. A status column 296 may indicate a status assigned by the user to a domain. An assigned status in column 296 may be, for example, "slanderous", "squatted" or "ours."

Figure 5:
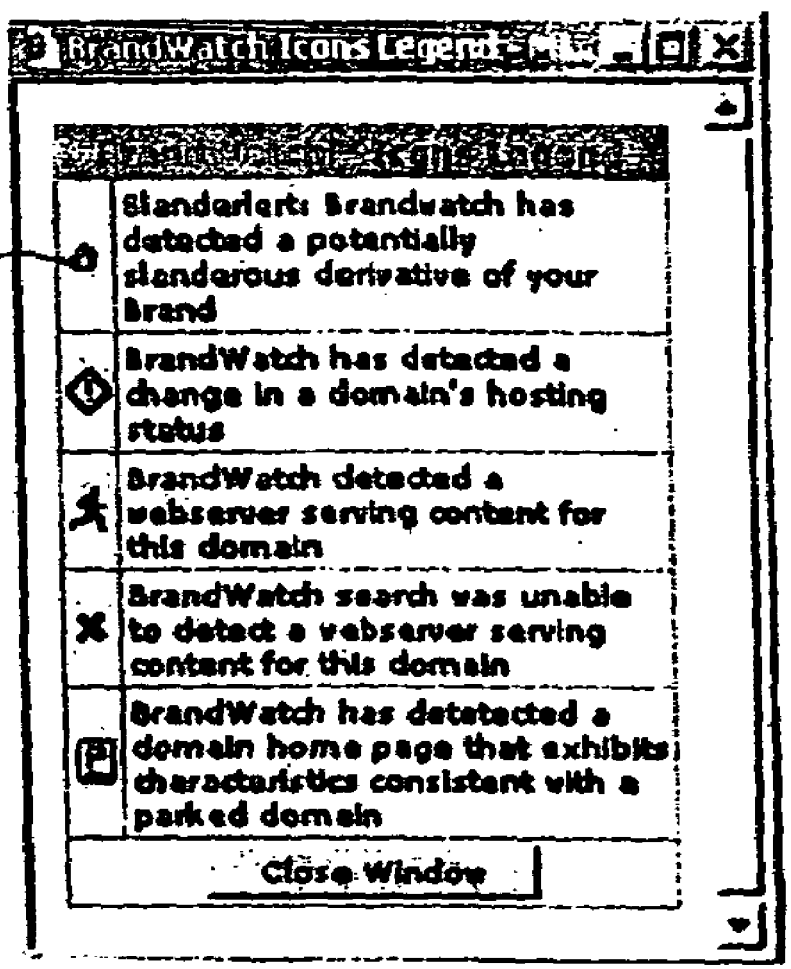
FIG. 5 illustrates an icon legends window according to various embodiments of the present invention.

In some embodiments, the system 100 may categorize and/or flag domain name information in various ways. Merely by way of example, FIG. 5 illustrates an icon legend 300 that may include icons 304 indicating, for example, the discovery of a potentially slanderous derivative of a brand, a change in a domain's hosting status, whether a web server was detected serving content for a domain, and/or a home page that appears consistent with a parked domain.

Figure 6:
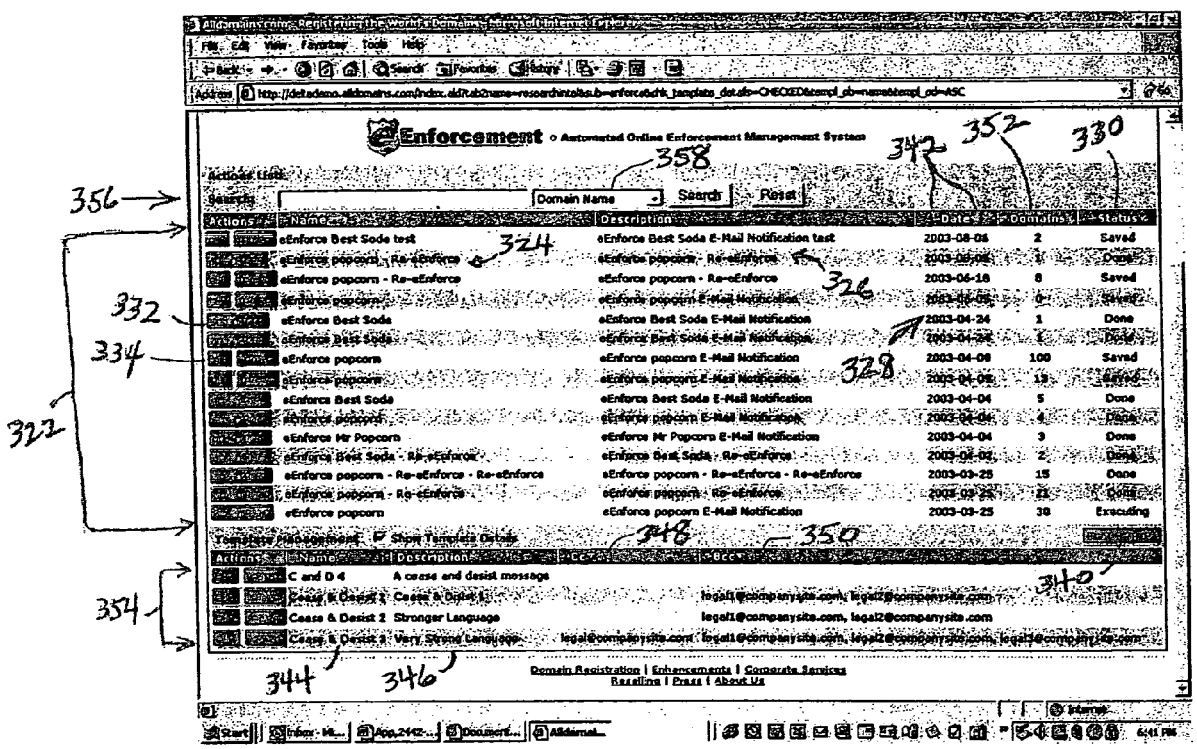
FIG. 6 illustrates a screen listing a plurality of enforcement actions and a plurality of templates according to various embodiments of the present invention.

In the foregoing exemplary manner, the system 100 may identify one or more domain names as subject to possible enforcement activity. The system 100 may also allow the user to initiate one or more enforcement action cycles. Merely by way of example, FIG. 6 illustrates an exemplary screen 310 that may be displayed when the user activates the enforcement option 286. The screen 310 may list a plurality of enforcement action groups 322. In some embodiments, each group 322 has a name 324 and description 326 given to it by the user. In further embodiments, a date field 328 may indicate a date of last activity.

In particular embodiments, each enforcement action group 322 may include one or more enforcement actions relating to one or more domains 254 selected by the user. The screen 310 may be configured to display a tally 352 of domains 254 included in each group 322. Each group 322 may also have an associated status 330. Merely by way of example, an enforcement action group 322 may have a status of "saved" (for example, for modification by the user), "done" or "executing." In an embodiment, group 322 that is "done" is completed; that is all email message(s) associated with the group 322 have been sent by the system 100. In another embodiment, and as further described below, an "executing" group 322 includes one or more email messages still awaiting delivery by the system 100. In some cases, a group 322 that is "done" or "executing" may be viewed by activating a "view actions" button 332 associated with the group 322. A group 322 that has not yet been selected for execution may be edited by the user upon activating an associated edit button 334 as further described below. As indicated by up- and down-arrows 342, output on the screen 310 may be sorted by particular fields, e.g., by date 328, status 330, and/or name 324, in ascending or descending order.

Figure 7:
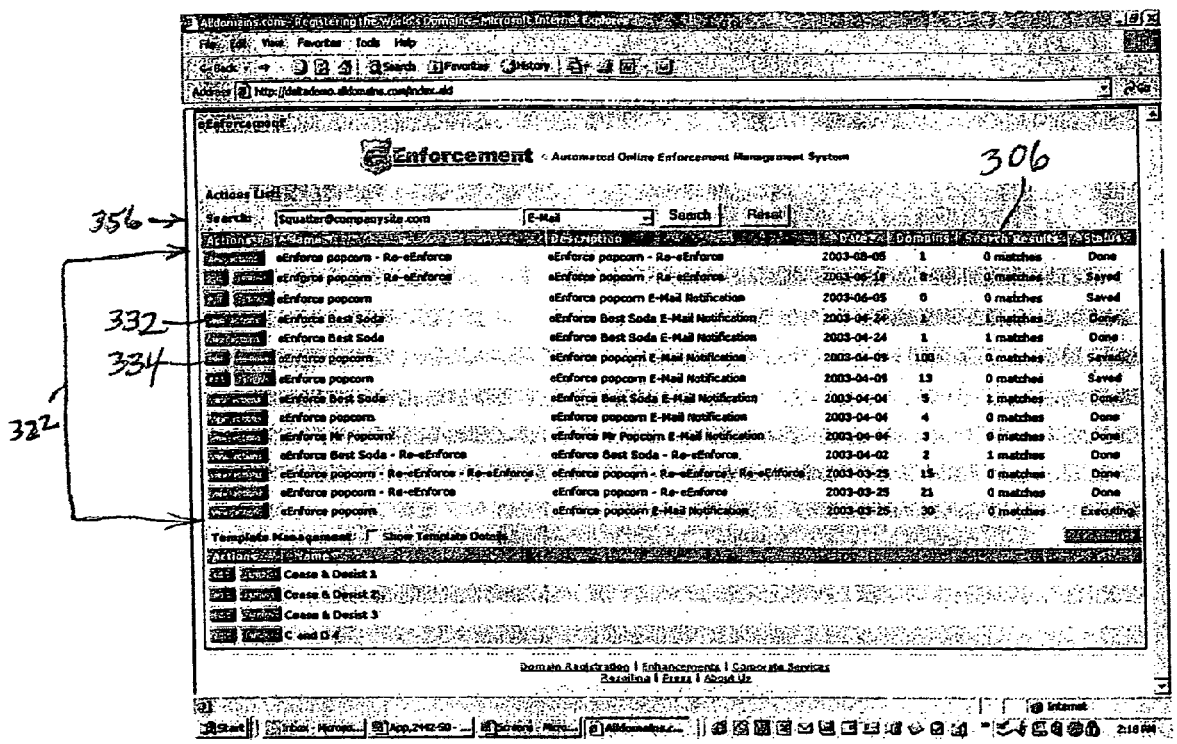
FIG. 7 illustrates a screen displaying results of a search based on an email address according to various embodiments of the present invention.

A search option 356 helps the user to identify domains included in the groups 322 based on particular WHOIS data. For example, the user may select a search field from a drop-down menu 358. Search fields may include, for example, a domain name, email address, administrative user, and/or organization. Results of such a search may be shown in a screen. Merely by way of example, FIG. 7 illustrates a screen 320 configured to display results of a search. In embodiments, a column 306 indicates results of such a search. It is shown, for example, in FIG. 7 that, for an email address Squatter@companysite.com, a plurality of matches are present for domains in the group 322. As further described below, the user may use buttons 332 and/or 334 to display domain information for any matching domains and, for example, customize enforcement activity with respect to some or all of such domains.

The system 100 may provide that a user may create and save a plurality of templates for email messages, e.g., cease-and-desist messages for delivery to one or more infringing domain holders. Referring again to FIG. 6, an area 354 indicates that, in this example, four templates have been created and saved by the user, as further described below. Templates may be edited, for example, by pressing an associated edit button 338. As further described below, each template may have a variety of fields (some of which may correspond to fields found in typical email messages), including without limitation a name 344, a description 346, "Cc" information 348 and "Bcc" information 350. Template information in the display area 354 may be sorted by template name 344, "Cc" information 348 and "Bcc" information 350.

Figure 8:
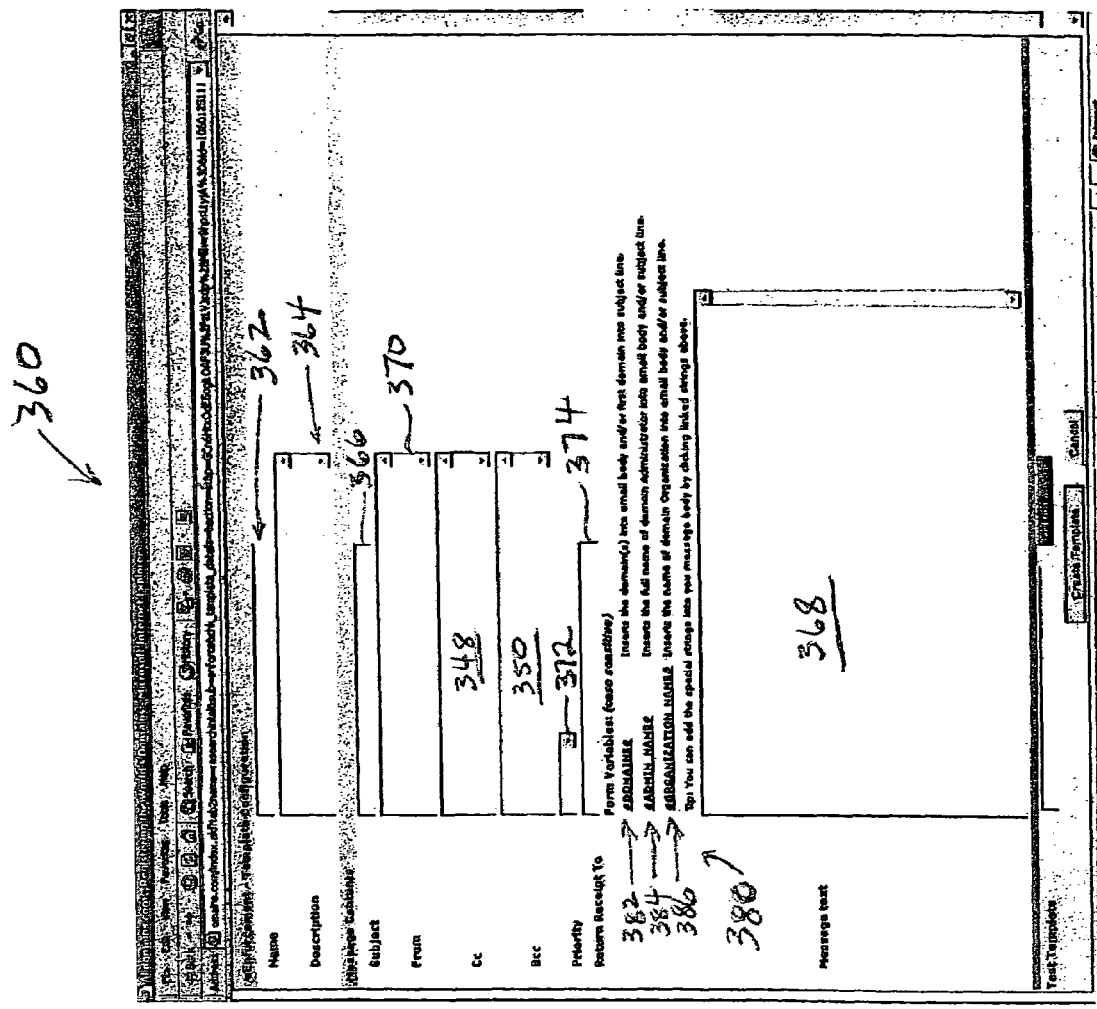
FIG. 8 illustrates a template configuration screen according to various embodiments of the present invention.

Some embodiments provide a "create template" button 340 (and/or similar functionality) to allow a user to display a template configuration screen, an exemplary illustration of which is numbered in FIG. 8 as 360. The user may enter into fields 362 and 364 a new template name 344 and new description 346 which may be used subsequently to retrieve and reference the template being created. The user may also enter information indicating a message subject into a field 366. The user may enter a priority into field 372 and a return receipt address into field 374. The user may also enter "Cc" and "Bcc" information 348 and 350, as previously described with reference to FIG. 6.

The user may enter, into a field 370, "From" information which may include a return email address for the user and/or for a proxy for the user, such as an administrative email address, etc. (This from information may be used, for example, to populate one or more fields in a message created from a template, including without limitation a "FROM:" field, a "REPLY-TO:" field, etc.) In some embodiments, when a message configured using the template configuration screen 360 is emailed to a recipient, the message may be emailed from one or more computers 104 of the system 100 (shown in FIG. 2), for example, as further described below. A recipient may reply to such email by replying to the address included in the "from" information 370. In other embodiments, an email message configured using the template configuration screen 360 may be emailed to a recipient in cooperation with the user's electronic mail application running, for example, on a computer 112 (shown in FIG. 2) associated with the user. For example, the message is sent to a recipient from the user's email address listed in the "from" information 370.

The user may enter a message into a message text area 368, using any of a variety of methods (including, merely by way of example, by cutting and pasting, by typing, by importing a document, etc.). It should be noted that recipient information "anchors" 380, including a domain name anchor 382, an administrator name anchor 384, and an organization name anchor 386, may be placed by the user into the message area 368. The "anchors" 380 may subsequently be automatically replaced by data associated with the appropriate domain(s) 254 before the system 100 sends email message(s) based on a template created using the screen 360.

Figure 9:
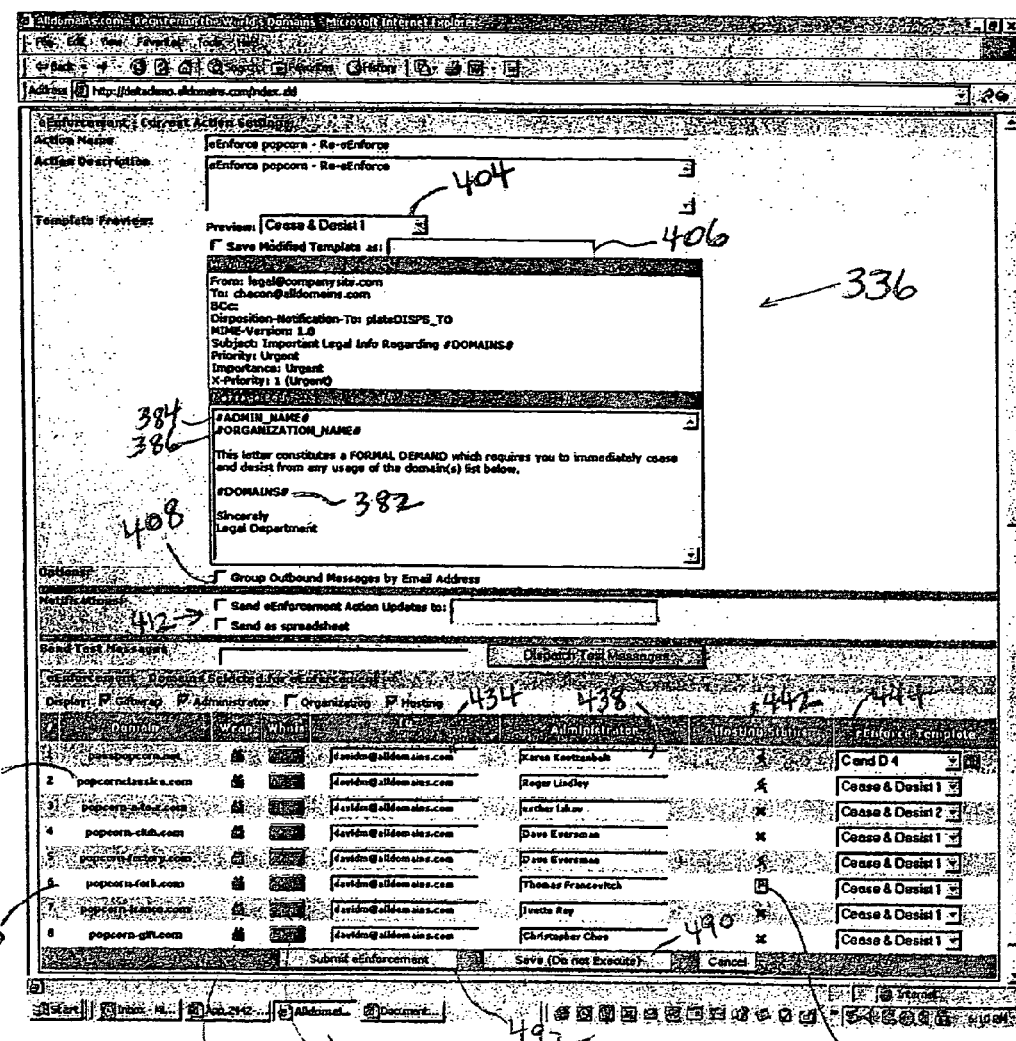
FIG. 9 illustrates an enforcement action preview screen according to various embodiments of the present invention.

When a user activates an edit button 334 (shown in FIG. 6) for an uncompleted enforcement action group 322, a screen 400 may be displayed as shown in FIG. 9. A facility (such as a template preview menu 404) may allow the user may display and/or edit any templates that have been saved and not yet sent. The user may rename and/or save a modified template by activating a save option 406. Thus, for example, the user may individualize a template where it is desired to send a customized message to a particular recipient. As may be seen in a template 336 being previewed as shown in FIG. 9, anchors 380 have been inserted by the user into the template 336, to be replaced by appropriate information obtained, for example, from the searchable WHOIS database 120, before a message based on the template 336 is sent. An option 408 allows the user to group outbound messages by email address. A notification option 412 may allow the user to send enforcement action updates to a third party, e.g., to in-house or outside counsel, and/or, if desired, to create a report of such updates (e.g., by creating a spreadsheet comprising the updates). The report may also be sent to a third party.

In some embodiments, Hyperlinks 416 may be provided to the domains 254 included in the enforcement action group 322 shown in the screen 400. Thus, the user may check website status or other online information of interest pertaining to a particular domain 254. A "wrap" field 420, when activated, may allow the user to assemble an enforcement history for delivery, for example, to outside counsel, as further described below.

As noted above, in some embodiments, data from the searchable WHOIS database 120 may be inserted automatically into one or more email messages to be sent in connection with an enforcement action group 322. In such embodiments, the screen 400 may include, without limitation, a column 430 for domain name(s), a column 434 for email address(es) to receive email message(s), a column 438 for administrator information pertaining to the domain name(s), a hosting status column 442; and/or a template column 444 indicating which template is being used for an email being sent with respect to a given domain name. Although not shown in FIG. 9, organization data may be displayable for domain names in the screen 400. Information may be sorted for display in the screen 310, for example, by domain name 430, address 434, administrator information 438 and/or hosting status 442. Additionally or alternatively, by clicking on the appropriate icon 304, the user may link to (e.g. download, view in a web browser, etc.) a parked or active host site for a particular domain 254. In such manner, a user may check, for example, if a domain is actively hosted and/or gain access to information that might not be available from the searchable WHOIS database 120. If a user obtains such information, he/she may enter it manually into the appropriate column and/or field of the screen 400. The screen 400 may also have a save field 490 and/or an execution field 492 further described below.

Figure 10:
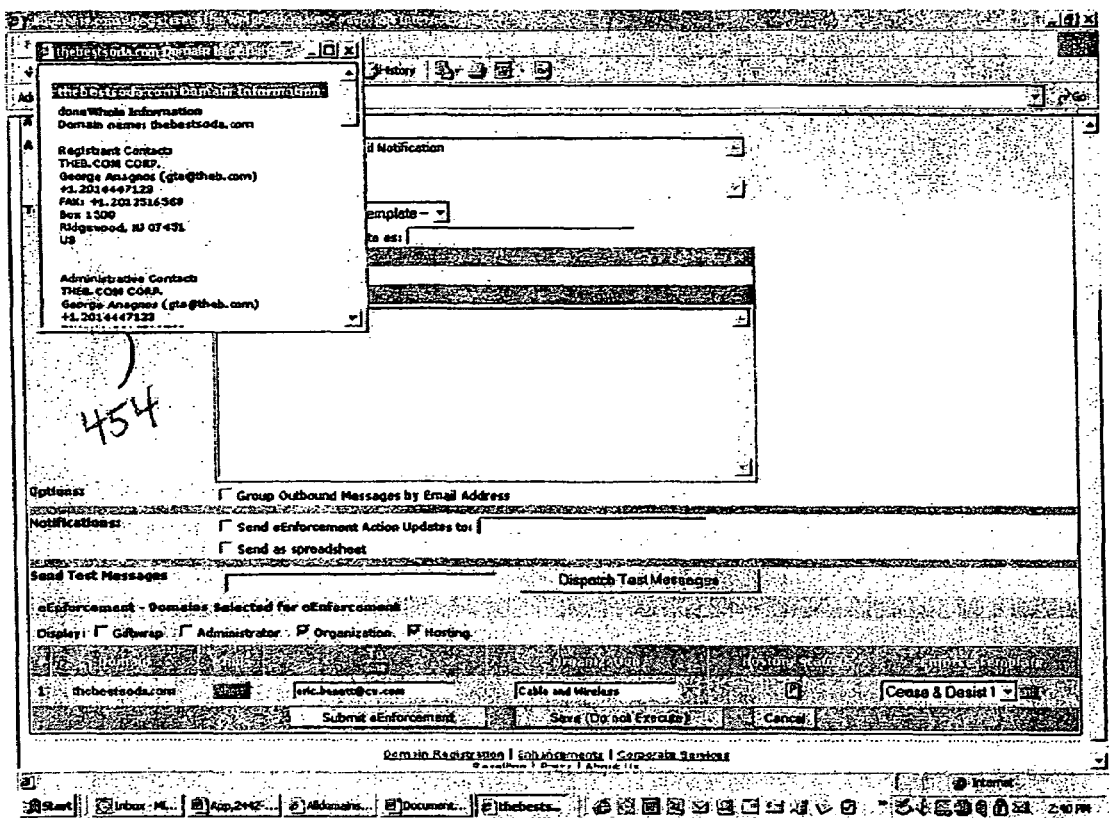
FIG. 10 illustrates a screen displaying WHOIS information according to various embodiments of the present invention.

A "WHOIS" field 424, when activated for a given domain name, may cause WHOIS information to be displayed as shown in FIG. 10. FIG. 10 illustrates a screen 450 in which a window 454 is displayed. The window 454 may display WHOIS information retrieved from the searchable WHOIS database 120 (and/or from a traditional WHOIS database 124) for the given domain name 254. In certain aspects, the user can, for example, compare the WHOIS information to information in a template 336 under consideration.

Referring again to FIG. 4, some embodiments may allow a user to selectively activate one or more enforcement action options 286 to select one or more enforcement action groups 322. The user may preview and/or edit a enforcement action group 322 as described above. Referring to FIG. 9, by activating the save field 490, the user may save the enforcement action group 322 for future activity. When, for example, a group 322 has been previewed, edited and/or is ready for execution, the user may activate the execution field 492. The system 100 may then retrieve (e.g., from the searchable WHOIS database 120) and/or insert appropriate recipient information into the anchors 380 of the appropriate email template(s) 336. The system 100 may then send those email messages for which sufficient information is available to recipients associated with the appropriate domain(s) 254 via the Internet 116.

Figure 11:
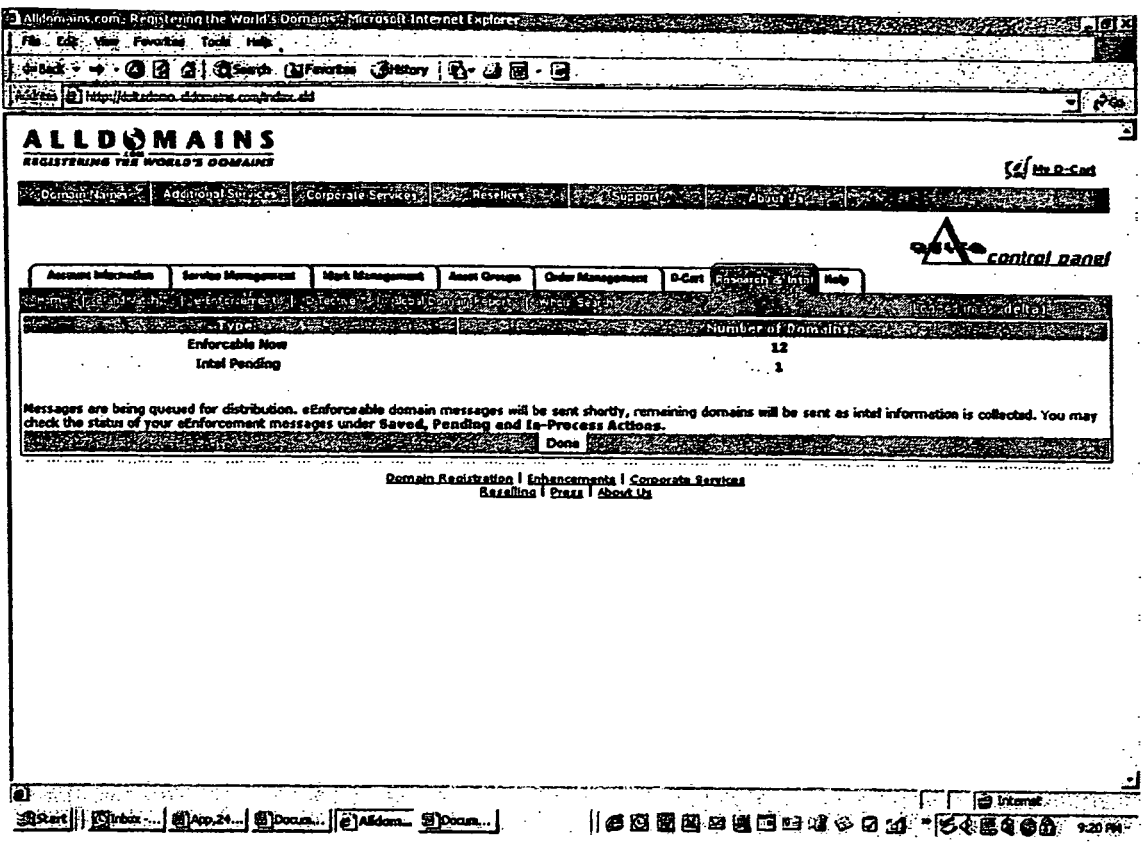
FIG. 11 illustrates a message screen according to various embodiments of the present invention.

FIG. 11 displays an exemplary screen 460, which may be displayed, according to a set of embodiments, after an enforcement action group 322 is activated for execution via field 492. As indicated by the screen 460, the system 100 may hold email for any domain 254 for which no email address is available from the searchable WHOIS database 120. In one embodiment, the system 100 may immediately proceed to search the Internet as previously described to obtain an appropriate email address for a held message. The system may also periodically check the searchable WHOIS database 120 and/or a traditional WHOIS database 124 to determine whether such information has become available.

Additionally or alternatively, when previously unavailable WHOIS information has been obtained, it may be entered manually (e.g., as described above with reference to FIG. 9), whereupon the system 100 may format and send the appropriate email message(s). In certain aspects, when all such message(s) have been sent for a particular enforcement action group 322, the system 100 may mark the group 322 as "done."

Figure 12:
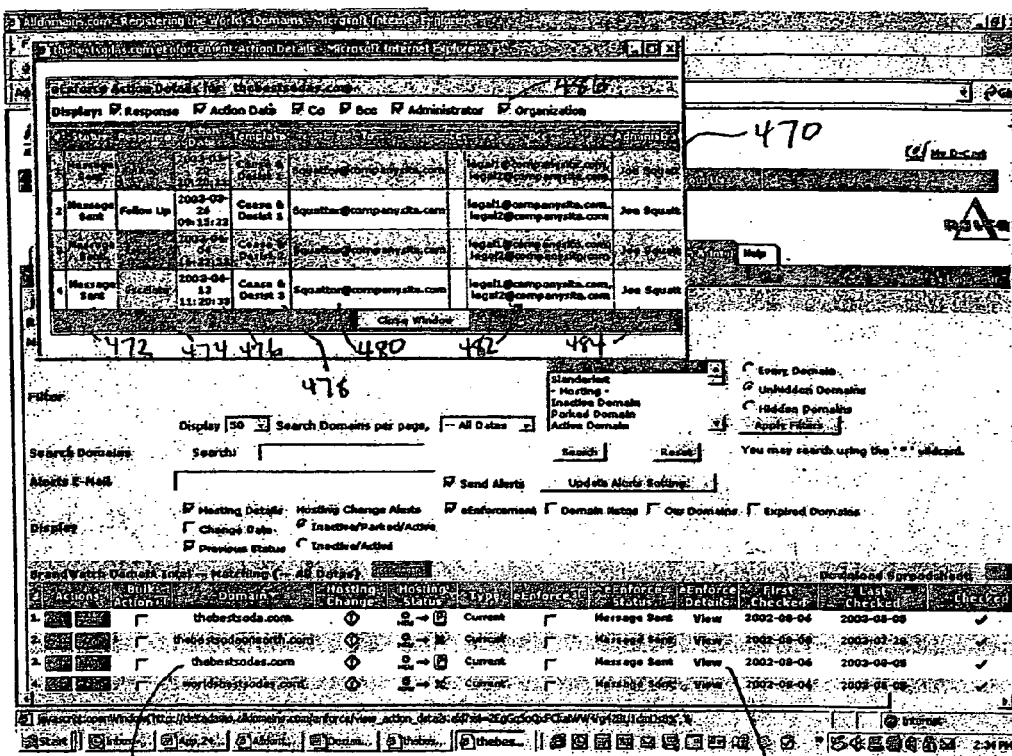
FIG. 12 illustrates a screen in which is displayed a window including domain enforcement action details according to various embodiments of the present invention.

In any single enforcement action group 322, various templates 478 may be prepared and/or sent to domains 254. The system 100 may keep track of which template(s) 478 have been sent to a particular domain 254. The system 100 may assist a user in managing responses (and/or lack thereof) to enforcement actions in the group 322. For example, as previously mentioned with reference to FIG. 4, a user may view details for a particular domain name 254 by activating an enforcement details field 284 in the screen 250. Referring now to FIG. 12, in some embodiments, when the user activates one of the fields 284, a window 470 may be displayed in the screen 250. Displayed in the window 470, in some embodiments, are details for enforcement action cycle(s) initiated and/or implemented with respect to the particular domain 254. Specifically, such details may include status 472, response(s) 474, action date(s) 476, template(s) 478, "To" email address(es) 480, Cc and/or Bcc information 482, administrator information 484, and/or organization information 486 (selected but not visible in the window 470).

Figure 13:
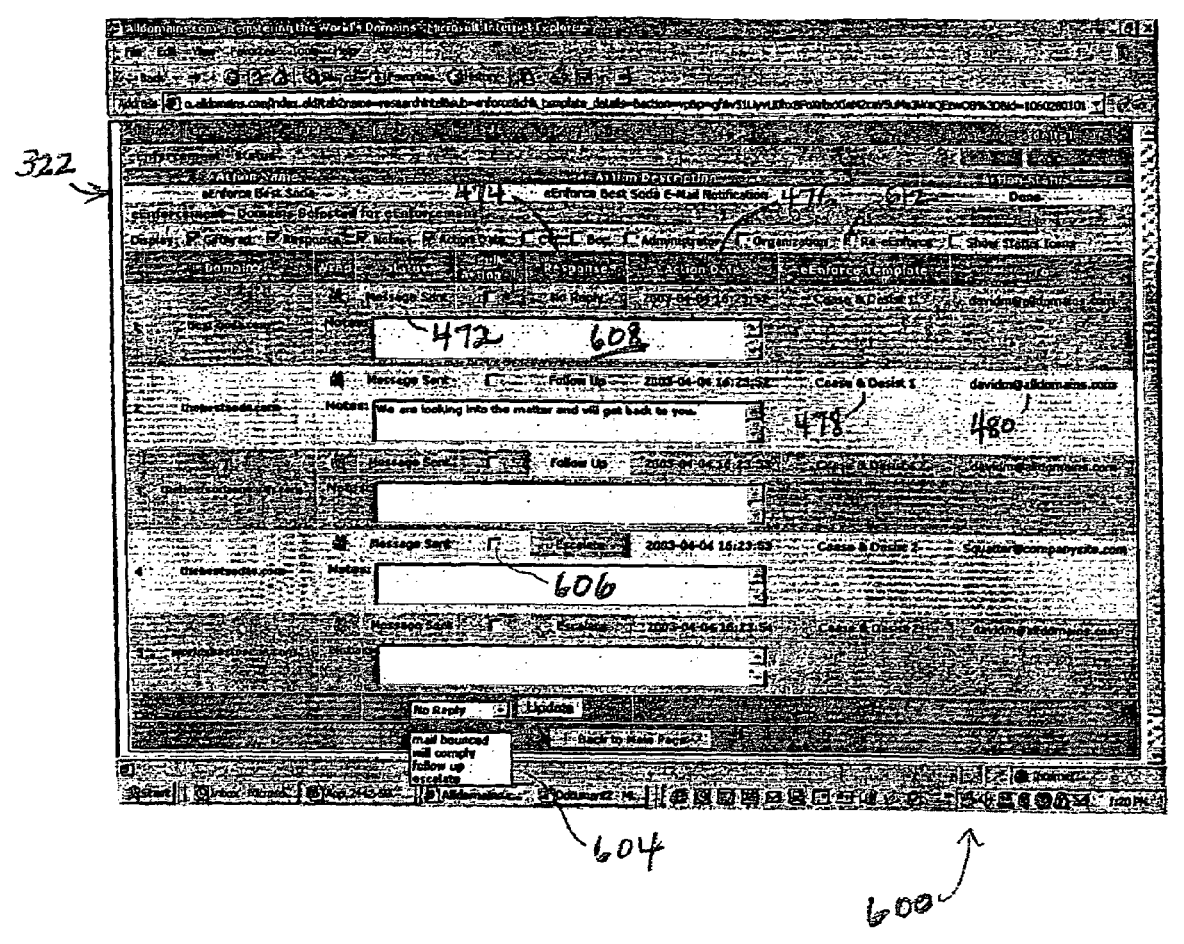

A user may add and/or update follow-up information as shown in the window 470, for any or all domains 254 in a completed or executing enforcement action group 322, by activating a "view actions" button 332 from screen 310 (shown in FIG. 6). FIG. 13 illustrates embodiments of a status screen 600 displayed for a selected group 322. The status field 472, response 474, action date 476, template field 478 and "To" field 480 (shown for an individual domain 254 in FIG. 12) are among those that may be displayed and/or displayable on the screen 600 for each domain 254 included in the group 322. A user may activate a drop-down menu 604 in combination with one or more selection options 606 to select an appropriate entry for one or more of the response field(s) 474. In some aspects, the user may insert, for example, "No Reply", "Mail Bounced", "Follow Up", "Will Comply", or "Escalate" in accordance, for example, with a response (or absence of response) pertaining to the particular domain 254. The user may also document a response in detail, for example, by cutting and pasting an email response from a domain into a note field 608, or by entering comments into the notes field 608. When the user enters "Escalate" in a response field 474 for a given domain name, the system 100 may display a history of enforcement activity for that domain name. The user may cause such information to be "wrapped" for transfer, for example, to outside counsel as further described below.

In certain aspects, by selecting one or more domains via selection option(s) 606 in combination with a "Re-enforce" option 612, the user may include the selected domain(s) in a new enforcement action group 322. The user may select one or more templates and/or create new template(s) as previously described, for use in the new group 322. In aspects of the present invention, the user may, for example, send another email that is more aggressive than a previous email sent to a recalcitrant domain holder.

Figure 14:
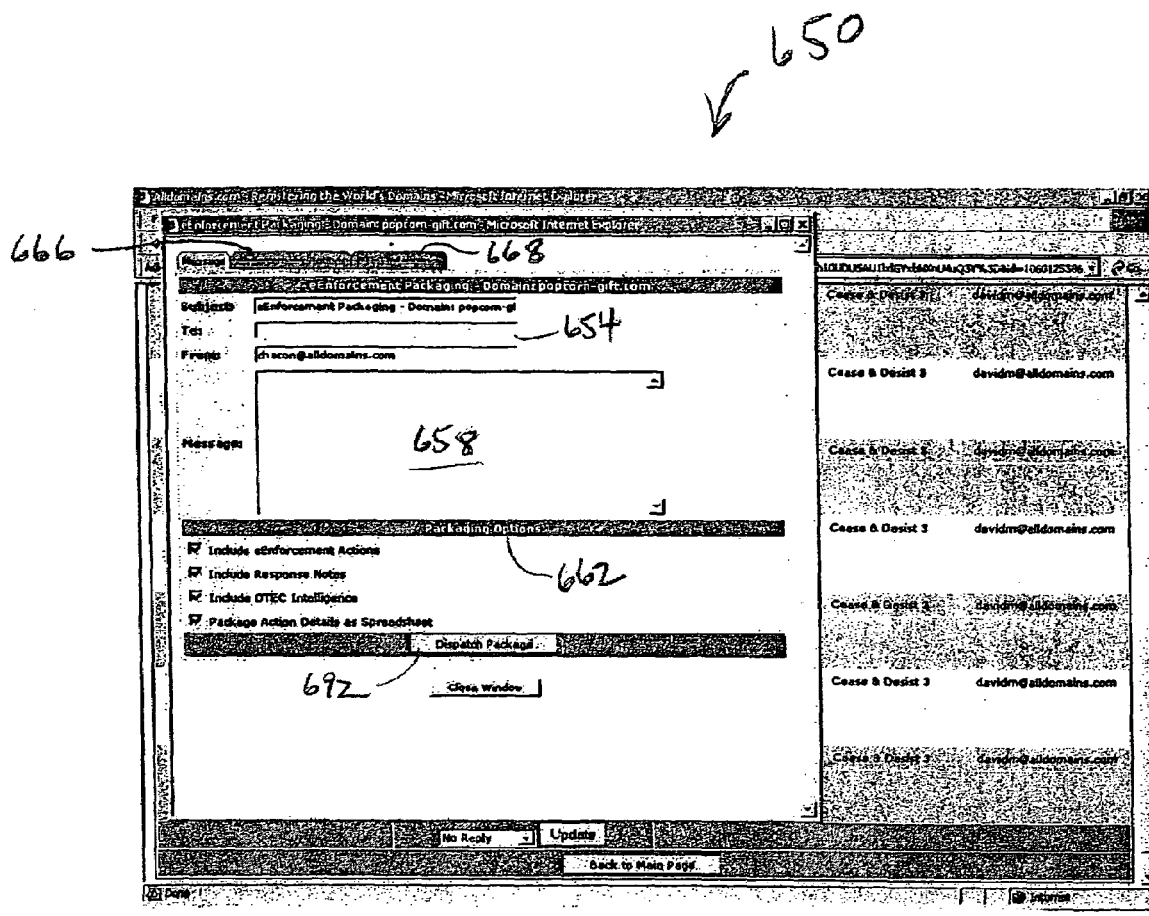
FIG. 14 illustrates a message configuration window according to various embodiments of the present invention.
Figure 15:
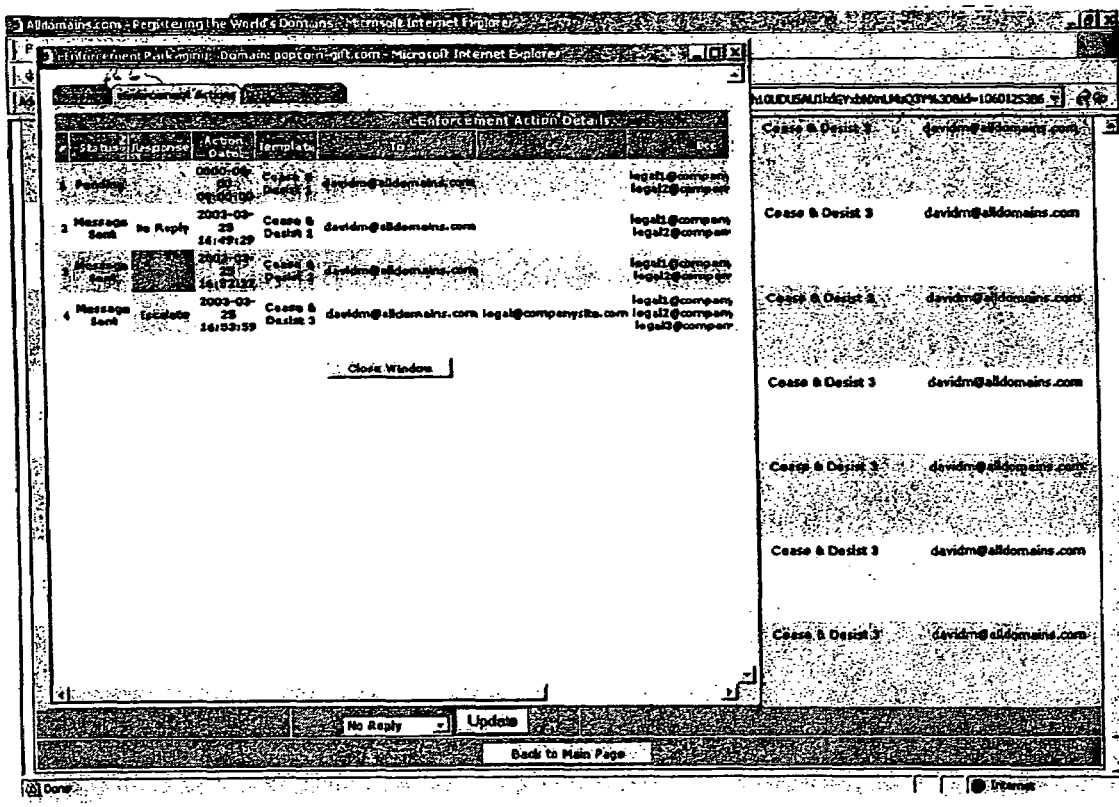
FIG. 15 illustrates a window including domain enforcement action details according to various embodiments of the present invention.
Figure 16:
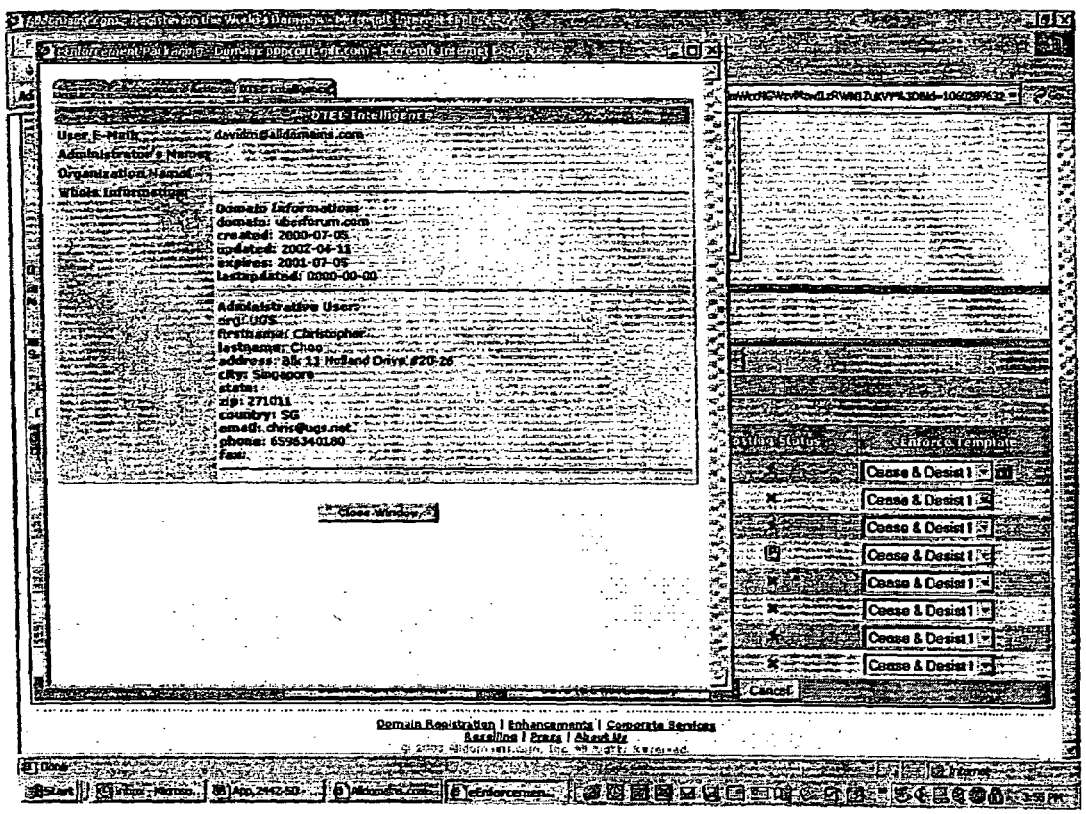
FIG. 16 illustrates a window including WHOIS-related information according to various embodiments of the present invention.

When a user decides, for example, that it is time to consult outside counsel for purposes of filing suit against a domain holder, the user may cause the system 100 to gather all information pertaining to the domain. Specifically, the user may activate the "wrap" field 420 (shown in FIG. 9) and provide for assembly of an enforcement history as follows. A message template window, numbered in FIG. 14 as 650, may be displayed to the user, who enters an email address in a field 654 and/or a message for a recipient, e.g., outside counsel, into a field 658. The user may specify, as packaging options 662, whether, for example, to include enforcement action cycle(s), response notes 608, information from the searchable WHOIS database 120 (and/or another WHOIS database 124) pertaining to the domain at issue, and/or to package enforcement action details as a spreadsheet. Relevant enforcement action cycles may be displayed by selecting a tab 666 from the window 650. Such action(s) may be displayed in a window indicated generally in FIG. 15 by reference number 680. Information from the searchable WHOIS database 120 (and/or another WHOIS database 124 pertaining to the domain at issue may be displayed by selecting a tab 668 from the windows 650 or 680. Such information may be displayed in a window indicated generally in FIG. 16 by reference number 690. The user may activate a dispatch option 692 (shown in FIG. 14) to cause the foregoing domain-related information to be sent via email to the email address field 654.

The foregoing embodiments may allow a domain holder to keep watch over what otherwise could be an overwhelming task. When, for example, domain names conflicting with a company brand name are numbered in the hundreds, embodiments of the foregoing systems and methods may simplify the processes not only of detecting such domains, but also of notifying domain holders, keeping track of responses from domain holders, and/or following up on such notifications and responses. Further embodiments may provide for the quick detection of conflicting domains. In some aspects of the present invention, detection of conflicting domains may occur within a day or two after domain name registration. In other embodiments, because domain registration information may be obtained quickly, for example, from the searchable WHOIS database, domain enforcement may be facilitated quickly. In a particular set of embodiments, the automatic insertion of WHOIS data, for example, into email cease-and-desist messages, may greatly simplify and increases the accuracy of communication with holders of conflicting domains. In further embodiments, because email messages may be sent automatically when addressing information becomes available from the searchable WHOIS database, a user may rest assured that most, if not all, such email will eventually be sent.

In accordance with some embodiments of the invention, the methods and procedures described above may be performed with a dedicated client software application in communication with a server application. Other embodiments feature a single application program, which may reside on a client computer, such as a PC, etc., and which may be configured to access one or more databases, as described above. A particular set of embodiments may be implemented as a set of one or more web applications (which might feature client- and/or server-side scripts, Java applets, CGI applications, etc) configured to interface with one or more databases, which might be resident on one or more servers. In such embodiments, for example, a user might use a web browser to access screens such as the screens illustrated by FIGS. 3-16, allowing the use of certain embodiments by a user located at any location with access (e.g., via a LAN, a WAN, the Internet, etc.) to a server on which the system is implemented.

In the foregoing description, for the purposes of illustration, various methods and/or procedures were described in a particular order. It should be appreciated that in alternate embodiments, the methods and/or procedures may be performed in an order different than that described. It should also be appreciated that the methods described above may be performed by hardware components and/or may be embodied in sequences of machine-executable instructions, which may be used to cause a machine, such as a general-purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMs, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods and/or procedures described above. In particular embodiments, for example, there may be a plurality of software components configured to execute on various hardware devices. Alternatively, the methods may be performed by a combination of hardware and software.

Hence, while detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments may be substituted and/or combined. Thus, the above description should not be taken as limiting the scope of the invention, which is defined by the appended claims.

What is claimed is:

1. A computer-implemented method, comprising:
   receiving data for identifying one or more domain names potentially subject to enforcement activity;
   generating, based at least in part on user input, one or more enforcement messages for sending to one or more parties associated with said one or more domain names, wherein the user input includes a selection of one or more enforcement message templates having predetermined text;
   sending the one or more enforcement messages to said one or more parties; and
   displaying, via a user interface, an enforcement summary screen, the enforcement summary screen comprising:
      a list of one or more enforcement action groups, each of the one or more enforcement action groups including an enforcement action that relates to the one or more domain names, the list comprising a name of each of the one or more enforcement action groups and a set of characteristics of each of the one or more enforcement action groups;
      a filter interface to allow the user to filter the list of one or more enforcement action groups by a selected characteristic;
      an enforcement action group display option, the enforcement display option selectable to display an enforcement action group display showing details of a selected enforcement action group; and
      an enforcement action option, the enforcement action option selectable to display an enforcement action screen for one or more of the enforcement action groups.

2. The method of claim 1 wherein the one or more enforcement messages are sent in response to input from a user.

3. The method of claim 1 wherein receiving data comprises receiving said data from a user.

4. The method of claim 1 wherein the received data directly identifies said one or more domain names.

5. The method of claim 1 further comprising searching one or more databases using the received data to identify the one or more domain names potentially subject to enforcement activity by the user.

6. The method of claim 5 wherein the one or more databases comprise at least one of a name server database and a WHOIS database.

7. The method of claim 1 wherein the received data identifies one or more trademarks associated with a user.

8. The method of claim 1 wherein generating and sending the one or more enforcement messages comprises generating and sending said one or more messages in cooperation with an electronic mail application running on a computer associated with a user.

9. The method of claim 1 further comprising storing data related to the one or more enforcement messages to said one or more parties.

10. The method of claim 9 further comprising:
    receiving data from a user related to one or more responses to the one or more enforcement messages; and
    storing said data related to the one or more responses.

11. The method of claim 10 further comprising:
    displaying data to the user regarding one or both of enforcement messages sent and responses received.

12. The method of claim 11 further comprising sending the data regarding the messages sent and responses received to a third party identified by the user.

13. The method of claim 1, wherein the set of characteristics comprises one or more characteristics selected from the group consisting of a description of each of the one or more enforcement action groups, a date of last activity corresponding to each of the one or more enforcement action groups, a number of enforcement targets in each of the one or more enforcement action groups, and a status of each of the one or more enforcement action groups.

14. The method of claim 1, further comprising:
receiving a selection of the enforcement action option for a selected enforcement action group;
in response to receiving the selection of the enforcement action option, displaying, via the user interface, an enforcement action screen, the enforcement action screen comprising:
an enforcement action display, for displaying details about an enforcement action against an enforcement target in the selected enforcement action group;
a template selection interface, for selecting a template for the enforcement action;
wherein the user input is provided through the template selection interface.

15. The method of claim 14, wherein the one or more domain names subject to enforcement activity are enforcement targets in the selected enforcement action group.

16. The method of claim 14, wherein the enforcement action screen comprises a template edit option, the template edit option selectable to allow the user to edit the text of the template, the method further comprising:
receiving a selection of the template edit option;
in response to receiving the selection of the template edit option, displaying a template edit interface screen, the template edit interface screen comprising a message text area;
receiving user input editing the template text in the message text area, the user input comprising one or more recipient information anchors, each of the recipient information anchors to be replaced by data associated with an appropriate enforcement target when the template is used as the basis for an enforcement message; and
in response to the user input, modifying the template.

17. The method of claim 1, wherein the enforcement action group display comprises:
a name field displaying names of one or more enforcement targets in the enforcement action group;
a description field displaying a description of the enforcement action group;
a list of one or more enforcement actions related to the enforcement action group, the list of one or more enforcement actions comprising a set of columns, the set of columns comprising:
an enforcement target column displaying, for each of the enforcement actions, one or more enforcement targets at which the enforcement action is directed;
a status column displaying a status of each of the enforcement actions;
an enforcement response column displaying a response, if any, to each of the enforcement actions; and
a date of each of the enforcement actions; and
a sort interface that is selectable to sort the enforcement action groups by one or more of the columns.

18. The method of claim 1, further comprising displaying for a user, via a user interface, a domain name search results screen for displaying a plurality of domain names matching a search criteria, the domain name search results screen comprising:
a first column displaying hosting change information for each of the plurality of domain names;
a second column displaying hosting status information for each of the plurality of domain names;
a third column to allow the user to indicate whether each of the plurality of domain names has been reviewed;
a fourth column displaying, for each of the plurality of domain names, a first date when the domain name was first checked and a second date when the domain name was last checked; and
a fifth column displaying the status of each of the plurality of domain names;
wherein receiving data for identifying one or more domain names potentially subject to enforcement activity comprises receiving user input selecting the one or more domain names from among the plurality of domain names displayed on the domain name search results screen.

19. A computer-implemented method, comprising:
identifying one or more domain names as subject to enforcement activity by a user;
in response to input from the user, initiating one or more enforcement action cycles relative to at least one of the one or more domain names;
receiving data related to one or more responses to at least one of the enforcement action cycles;
storing said data related to the one or more responses; and
displaying, via a user interface, an enforcement summary screen, the enforcement summary screen comprising:
a list of one or more enforcement action groups, each of the one or more enforcement action groups including an enforcement action that relates to the one or more domain names, the list comprising a name of each of the one or more enforcement action groups and a set of characteristics of each of the one or more enforcement action groups;
a filter interface to allow the user to filter the list of one or more enforcement action groups by a selected characteristic;
an enforcement action group display option, the enforcement display option selectable to display an enforcement action group display showing details of a selected enforcement action group; and
an enforcement action option, the enforcement action option selectable to display an enforcement action screen for one or more of the enforcement action groups.

20. The method of claim 19 further comprising adding the one or more initiated enforcement action cycles to one or more enforcement action histories for the one or more domain names.

21. The method of claim 19 further comprising:
receiving input from the user indicating a reaction status relating to one of the one or more enforcement action cycles; and
storing the reaction status to complete the one cycle.

22. The method of claim 19 wherein initiating one or more enforcement action cycles comprises allowing the user to determine at least one email message template for delivery to at least one address associated with the one or more domain names.

23. The method of claim 22 wherein allowing the user to determine at least one email message template comprises:
receiving an email message body composed by the user; and
saving the message body in the template.

24. The method of claim 22 further comprising delivering the at least one message to the at least one address in response to a delivery option activated by the user.

25. The method of claim 24 further comprising obtaining the at least one address from the internet in response to the activated delivery option.

26. The method of claim 24 further comprising;
holding the at least one selected email message until the at least one address is obtained; and
searching the internet to obtain the at least one address.

27. The method of claim 19 wherein initiating one or more enforcement action cycles relative to at least one of the one or more domain names comprises initiating concurrently a plurality of enforcement action cycles relative to a plurality of the identified domain names.

28. The method of claim 19 further comprising initiating consecutively a plurality of enforcement action cycles relative to one of the one or more domain names.

29. The method of claim 19 further comprising grouping a plurality of domains in a first enforcement action group.

30. The method of claim 29 further comprising selecting one or more of the plurality of domain names in the first enforcement action group for inclusion in a second enforcement action group.

31. A system comprising at least one processor and at least one computer readable medium in communication with the processor, wherein the computer readable medium comprises instructions executable by the processor to:
  identify from data received by the processor one or more domain names potentially subject to enforcement activity;
  generate one or more enforcement messages to send to one or more parties associated with said one or more domain names, the one or more enforcement messages generated from a template having predetermined text;
  send the one or more enforcement messages to said one or more parties;
  receive one or more responses to the one or more enforcement messages;
  store the one or more responses; and
  display, via a user interface, an enforcement summary screen, the enforcement summary screen comprising:
    a list of one or more enforcement action groups, each of the one or more enforcement action groups including an enforcement action that relates to the one or more domain names, the list comprising a name of each of the one or more enforcement action groups and a set of characteristics of each of the one or more enforcement action groups;
    a filter interface to allow the user to filter the list of one or more enforcement action groups by a selected characteristic;
    an enforcement action group display option, the enforcement display option selectable to display an enforcement action group display showing details of a selected enforcement action group; and
    an enforcement action option, the enforcement action option selectable to display an enforcement action screen for one or more of the enforcement action groups.

32. A computer program embodied on at least one computer readable medium, the computer program comprising instructions executable by one or more computers to:
  identify one or more domain names as subject to enforcement activity by a user;
  initiate one or more enforcement action cycles relative to at least one of the one or more domain names in response to input from the user;
  receive a response pertaining to the one or more enforcement action cycles from a party; and
  store the response; and
  display, via a user interface, an enforcement summary screen, the enforcement summary screen comprising:
    a list of one or more enforcement action groups, each of the one or more enforcement action groups including an enforcement action that relates to the one or more domain names, the list comprising a name of each of the one or more enforcement action groups and a set of characteristics of each of the one or more enforcement action groups;
    a filter interface to allow the user to filter the list of one or more enforcement action groups by a selected characteristic;
    an enforcement action group display option, the enforcement display option selectable to display an enforcement action group display showing details of a selected enforcement action group; and
    an enforcement action option, the enforcement action option selectable to display an enforcement action screen for one or more of the enforcement action groups.

* * * * *